US012701617B2

(12) United States Patent
Hou et al.

(10) Patent No.: US 12,701,617 B2
(45) Date of Patent: Aug. 4, 2026

(54) METHOD AND NETWORK NODE OF WIRELESS COMMUNICATION NETWORK FOR HANDLING RANDOM ACCESS

(71) Applicant: Telefonaktiebolaget LM Ericsson (publ), Stockholm (SE)

(72) Inventors: Xueying Hou, Lund (SE); Bo Xu, Täby (SE); Pål Frenger, Linköping (SE)

(73) Assignee: TELEFONAKTIEBOLAGET LM ERICSSON, (Publ) Stockholm (SE)

( * ) Notice: Subject to any disclaimer, the term of this patent is extended or adjusted under 35 U.S.C. 154(b) by 309 days.

(21) Appl. No.: 18/286,595

(22) PCT Filed: Apr. 13, 2021

(86) PCT No.: PCT/SE2021/050334
§ 371 (c)(1),
(2) Date: Oct. 12, 2023

(87) PCT Pub. No.: WO2022/220710
PCT Pub. Date: Oct. 20, 2022

(65) Prior Publication Data
US 2024/0196441 A1     Jun. 13, 2024

(51) Int. Cl.
*H04W 74/0833* (2024.01)

(52) U.S. Cl.
CPC .............................. *H04W 74/0833* (2013.01)

(58) Field of Classification Search
CPC . H04W 74/0833; H04W 88/085; Y02D 30/70
See application file for complete search history.

(56) References Cited

U.S. PATENT DOCUMENTS 8,036,710 B2     10/2011  Walton et al.
2017/0303224 A1*  10/2017  Choi ................. H04W 56/0045
(Continued)

FOREIGN PATENT DOCUMENTS

KR       100907973 B1     7/2009

OTHER PUBLICATIONS

International Search Report and Written Opinion of the International Searching Authority, PCT/SE2021/050334, mailed Jan. 17, 2022, 13 pages.
(Continued)

*Primary Examiner* — Chuong M Nguyen
(74) *Attorney, Agent, or Firm* — Sage Patent Group

(57)          ABSTRACT

Disclosed is a method and a network node for handling random access in a wireless communication network. The method includes receiving a random access preamble when a first number of receivers are active and a second number of the receivers are inactive, and sending a random access response to the received random access preamble. The method further includes determining whether a reception requirement for a subsequent random access procedure message is fulfilled, the subsequent random access procedure message being sent subsequent to the network node sending the random access response, the reception requirement being either whether the random access procedure message is received at the network node or whether the random access procedure message that is received has a sufficient quality, and when the reception requirement is determined not fulfilled, activating at least some of the inactive second number of receivers.

20 Claims, 3 Drawing Sheets

(56)     References Cited

U.S. PATENT DOCUMENTS

2018/0077732 A1 *   3/2018   Yi ...................... H04W 74/0833
2019/0052334 A1 *   2/2019   Jeon .................. H04W 56/0005
2020/0350972 A1 *   11/2020   Yi .......................... H04B 7/088
2021/0051710 A1 *   2/2021   Cirik ................... H04W 74/002

OTHER PUBLICATIONS

3GPP TS 38.213 V15.6.0 (Jun. 2019); 3rd Generation Partnership
Project; Technical Specification Group Radio Access Network; NR;
Physical layer procedures for control (Release 15); 107 pages.
3GPP TS 38.321 V16.1.0 (Jul. 2020); 3rd Generation Partnership
Project; Technical Specification Group Radio Access Network; NR;
Medium Access Control (MAC) protocol specification (Release
16); 151 pages.
3GPP TS 38.331 V16.1.0 (Jul. 2020); 3rd Generation Partnership
Project; Technical Specification Group Radio Access Network; NR;
Radio Resource Control (RRC) protocol specification (Release 16);
906 pages.

* cited by examiner

METHOD AND NETWORK NODE OF WIRELESS COMMUNICATION NETWORK FOR HANDLING RANDOM ACCESS

CROSS REFERENCE TO RELATED APPLICATIONS

This application is a 35 U.S.C. § 371 national stage application of PCT International Application No. PCT/SE2021/050334 filed on Apr. 13, 2021, the disclosure and content of which is incorporated by reference herein in its entirety.

TECHNICAL FIELD

The present disclosure relates generally to methods and network nodes for handling random access in a wireless communication network. More specifically, the disclosure relates to methods and network nodes for handling or controlling random access of wireless devices to a wireless communication network. The present disclosure further relates to computer programs and carriers corresponding to the above methods and nodes.

BACKGROUND

In wireless communication networks, such as 5th Generation (5G) networks, e.g., New Radio (NR), power consumption is a big issue for network operators. For a network node, e.g., base station equipped with many transmitters (TX) and receivers (RX), one way to achieve better energy efficiency and reduce operational cost for this kind of network node is to switch off some antenna branches by inactivating TXs and/or RXs connected to these antenna branches, for example when data traffic between wireless devices and the network node is low. This may be called that the network node is in muting mode.

On the receiver part of the network node, inactivating some RXs to save power will cause reduction in uplink (UL) link budget and radio coverage. When a wireless device is in good channel conditions, e.g., close to the network node or in Line-Of-Sight (LOS), such reduction in UL link budget may not cause problems in communication quality between the wireless device and the network node. However, when the wireless device is in bad channel conditions, e.g., at the edge of the cell in which the network node provides coverage or in Non-LOS (NLOS), such reduction may cause communication failure in UL. In downlink (DL), this can be partly mitigated by the network node sending a power boosted Synchronization Signal Block (SSB) to preserve the DL broadcast coverage when some TXs are muted. However, for the UL, the received signal strength at the network node will be reduced when some RXs are inactivated, which will risk that signals from wireless devices cannot be received correctly at the network node. A situation when this problem may appear is in the random access procedure. For example, a wireless device trying to perform random access when some RXs of the network node are inactivated may not be able to do that even though the wireless device is within the cell of the network node. Consequently, there is a need for an improved random access procedure that mitigates such a problem.

SUMMARY

It is an object of the invention to address at least some of the problems and issues outlined above. It is possible to achieve these objects and others by using methods, network nodes and wireless devices as defined in the attached independent claims.

According to one aspect, a method is provided that is performed by a network node of a wireless communication network, the network node having a plurality of receivers. The method comprises receiving, from a wireless device, a random access preamble when a first number of the plurality of receivers are active and a second number of the plurality of receivers are inactive, and sending, to the wireless device, a random access response, in response to the received random access preamble. The method further comprises determining whether a reception requirement for a subsequent random access procedure message sent by the wireless device towards the network node is fulfilled, the subsequent random access procedure message being sent by the wireless device subsequent to the network node sending the random access response. The reception requirement is either whether the random access procedure message is received at the network node or whether the random access procedure message that is received has a sufficient quality. The method further comprises, when the reception requirement is determined not fulfilled, activating at least some of the inactive second number of receivers.

According to another aspect, a network node is provided that is configured to operate in a wireless communication network. The network node has a plurality of receivers. The network node comprises a processing circuitry and a memory. Said memory contains instructions executable by said processing circuitry, whereby the network node is operative for receiving, from a wireless device, a random access preamble when a first number of the plurality of receivers are active and a second number of the plurality of receivers are inactive, and sending, to the wireless device, a random access response, in response to the received random access preamble. The network node is further operative for determining whether a reception requirement for a subsequent random access procedure message sent by the wireless device towards the network node is fulfilled, the subsequent random access procedure message being sent by the wireless device subsequent to the network node sending the random access response, the reception requirement being either whether the random access procedure message is received at the network node or whether the random access procedure message that is received has a sufficient quality, and, when the reception requirement is determined not fulfilled, activating at least some of the inactive second number of receivers.

According to other aspects, computer programs and carriers are also provided, the details of which will be described in the claims and the detailed description.

Further possible features and benefits of this solution will become apparent from the detailed description below.

BRIEF DESCRIPTION OF DRAWINGS

The solution will now be described in more detail by means of exemplary embodiments and with reference to the accompanying drawings, in which.

DETAILED DESCRIPTION

Figure 1:
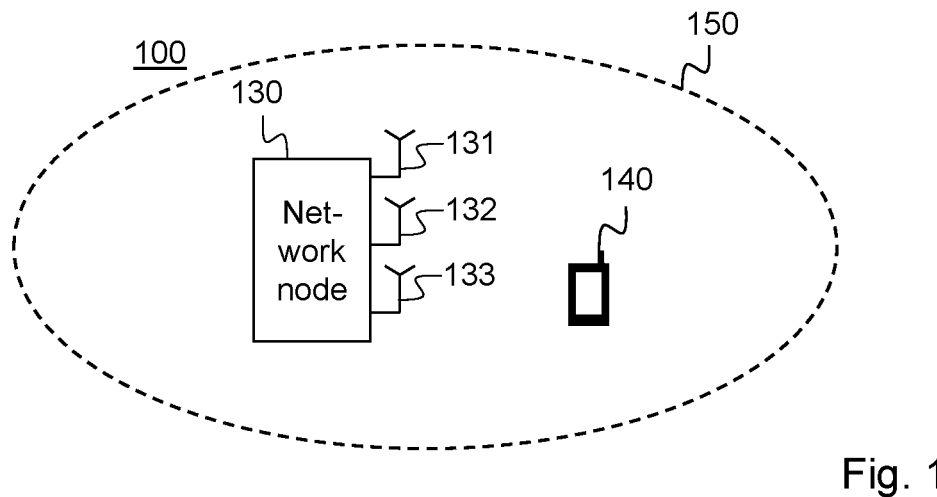
FIG. 1 is a schematic block diagram illustrating a wireless communication network in which the present invention may be used.

FIG. 1 shows a wireless communication network 100 comprising a radio access network (RAN) node aka network node 130 that is in, or is adapted for, wireless communication with a wireless communication device aka wireless device 140. The network node 130 provides radio access in a geographical area called a cell 150. The network node has a plurality of receivers 131, 132, 133.

The wireless communication network 100 may be any kind of wireless communication network that can provide radio access to wireless devices. Example of such wireless communication networks are networks based on Global System for Mobile communication (GSM), Enhanced Data Rates for GSM Evolution (EDGE), Universal Mobile Telecommunications System (UMTS), Code Division Multiple Access 2000 (CDMA 2000), Long Term Evolution (LTE), LTE Advanced, Wireless Local Area Networks (WLAN), Worldwide Interoperability for Microwave Access (WiMAX), WiMAX Advanced, as well as fifth generation (5G) wireless communication networks based on technology such as New Radio (NR), and any possible future sixth generation (6G) wireless communication network.

The network node 130 may be any kind of network node that can provide wireless access to a wireless device 140 alone or in combination with another network node. Examples of network nodes 130 are a base station (BS), a radio BS, a base transceiver station, a BS controller, a network controller, a Node B (NB), an evolved Node B (eNB), a gNodeB (gNB), a Multi-cell/multicast Coordination Entity, a relay node, an access point (AP), a radio AP, a radio unit (RU), a remote radio head (RRH) and a multi-standard BS (MSR BS).

The wireless device 140 may be any type of device capable of wirelessly communicating with a network node 130 using radio signals. For example, the wireless device 140 may be a User Equipment (UE), a machine type UE or a UE capable of machine to machine (M2M) communication, a sensor, a tablet, a mobile terminal, a smart phone, a laptop embedded equipped (LEE), a laptop mounted equipment (LME), a USB dongle, a Customer Premises Equipment (CPE) etc.

In such wireless communication networks 100, the wireless device 140 initiates a random access procedure with the network node when it needs a connection with the network node 130, for example when the wireless device enters the cell 150 or is switched from inactive state to active state. An example of the random access procedure used in NR has the following course of events: After receiving an SSB and System Information Block 1 (SIB1), broadcasted by the network node, the wireless device first transmits a Physical Random Access Channel (PRACH) preamble, i.e., Message 1 (Msg 1) on communication resources referred to in the broadcasted system information. The PRACH is a physical channel, which only contains the random access preamble. After the network node has received the PRACH preamble, the network node transmits a random access response (RAR), i.e., Message 2 (Msg 2), indicating reception of the PRACH, including communication resources for a Physical Uplink Shared Channel (PUSCH) and providing a time-alignment command adjusting the transmission timing of the wireless device. The wireless device then sends a Message 3 (Msg 3) through the PUSCH to the network node with device identity and afterwards the network node sends a Message 4 (Msg 4) to the wireless device to ensure that any wireless device does not incorrectly use another wireless device's identity.

When the network node is in muting mode, a first number of the plurality of RXs of the network node are inactivated, aka muted. This means the network node only uses a subpart of its RXs for receiving, here called a second number of the plurality of RXs. Then the signal strength of signals received at the network node will be reduced. In such a muting mode, the random access procedure described above may not work correctly despite the wireless device being in the cell. In the following, a method is presented for mitigating such problems in the random access procedure.

Figure 2:
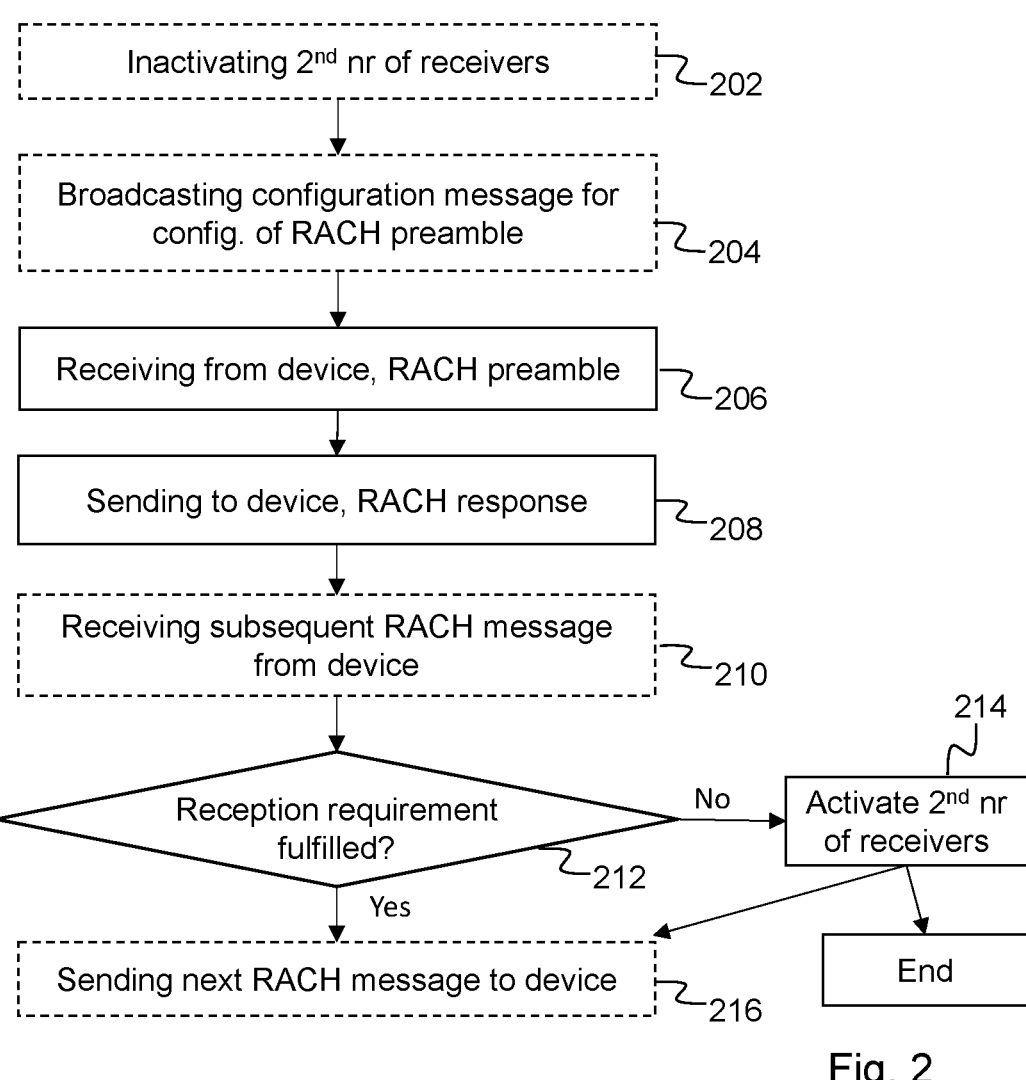
FIG. 2 is a flow chart illustrating a procedure performed by a network node, according to possible embodiments.

FIG. 2, in conjunction with FIG. 1, shows a method performed by a network node 130 of a wireless communication network 100, the network node 130 having a plurality of receivers 131, 132, 133. The method comprises receiving 206, from a wireless device 140, a random access preamble when a first number of the plurality of receivers are active and a second number of the plurality of receivers are inactive, and sending 208, to the wireless device 140, a random access response, in response to the received random access preamble. The method further comprises determining 212 whether a reception requirement for a subsequent random access procedure message sent by the wireless device 140 towards the network node 130 is fulfilled, the subsequent random access procedure message being sent by the wireless device subsequent to the network node sending 208 the random access response. The reception requirement is either whether the random access procedure message is received at the network node or whether the random access procedure message that is received has a sufficient quality. The method further comprises, when the reception requirement is determined not fulfilled, activating 214 at least some of the inactive second number of receivers.

Hereby, the network node 130 can save power by inactivating some of its receivers for example at low traffic, i.e. when there are only a few wireless devices in the cell 150 and/or when there are no wireless devices situated close to the cell 150. At the same time, the network node is able to increase the number of active receivers when it is determined that a random access procedure message has low quality, which indicates that a wireless device is trying to access that is e.g. at cell border, or not in line of sight or for any other reason has low signal strength. Also, this method allows the network node to activate at least some of the inactive receivers at the earliest time window, even before the transmission of traffic data to the wireless device. Thus, thanks to the above method, the base station power saving mode of inactivating receivers, aka muting mode, can be used dynamically and flexibly depending on the need of wireless devices.

The first number and the second number of receivers are subsets of the total plurality of receivers. None of the first or second number of receivers are zero. That any receiver (RX) is inactive may signify that the RX is muted. Here, a muted RX can be understood as one or more RX-components used for receiving signal are switched off or not operating for receiving signals. For example, a muted RX can be realized by switching off a Low-Noise Amplifier (LNA), or by putting a radio ASIC that receives UL signals in a clock-gating mode. The random access procedure may also be called a Random Access Channel (RACH) procedure. The subsequent random access procedure message may be a random access procedure Message 3 or Message 5 or any other following uplink message of the random access procedure.

According to an embodiment, the method further comprises broadcasting 204, before the receiving 206 of the random access preamble from the wireless device 140 and in connection with inactivation of the second number of receivers, a configuration message for configuration of the random access preamble. The configuration message includes a second configuration of the random access preamble that is more robust than a first configuration of the random access preamble that is to be broadcasted when no receivers or fewer receivers than the second number of receivers are inactivated. Further, the random access preamble that is received 206 by the network node is of the second configuration.

"In connection with inactivation of the second number of receivers" may signify in response to inactivation of the second number of receivers or by detecting that the second number of receivers are inactivated. By broadcasting such a configuration message, the network node instructs the wireless devices in its cell to send the random access preamble with a more robust configuration when some of the receivers of the network node have been inactivated, than when all or most of the receivers of the network node are up and running. Hereby, the network node can ensure that there is uplink coverage for random access preamble for the wireless devices in the cell, so that the network node will not miss a random access from a wireless devices in the cell, even if the number of receivers have been reduced in order to reduce power consumption at the network node.

According to an embodiment of this embodiment, the second configuration is more robust than the first configuration in that a sequence is configured for the random access preamble that is longer in time in the second configuration than in the first configuration. In other words, the second configuration uses a signal sequence that is longer in time than the signal sequence of the first configuration. As the signal sequence of the second configuration is longer in time than the signal sequence of the first configuration it becomes more robust, and it is more likely that the random access preamble of the second configuration reaches the network node than the random access preamble of the first configuration. The sequence of the random access preamble may be a Physical Random Access Channel, PRACH, format.

According to an embodiment, the second configuration of the broadcasted 204 configuration message includes a shortened random access preamble periodicity compared to the first configuration. To shorten the random access preamble periodicity signifies making it possible for the wireless devices to send a random access preamble, i.e. to do a random access, more often. This is advantageous taking into consideration that in case the subsequent random access channel procedure message is not received or received with an insufficient quality, the wireless device needs to do a new random access. By shortening the random access preamble periodicity, the latency for doing the new random access is shortened for the device. Further, shortening the random access preamble periodicity means more resources to random access compared to for traffic data. However, the muting/inactivating network node mode is normally used when traffic is low so then capacity for traffic data is not a problem.

According to another embodiment, the second configuration of the broadcasted 204 reconfiguration message includes a longer random access preamble periodicity compared to the first configuration. If the load on the random access channel is very low, it is very unlikely that a wireless device attempting to initiate a random access procedure will collide with any other wireless device. Hence, a longer random access preamble periodicity might still enable wireless devices to access the network with acceptable latency. If a longer periodicity is used, then the power ramping step can be increased to speed up the wireless device access and/or the power for the first random access attempt can be increased.

According to yet another embodiment, the method further comprises inactivating 202, before the receiving 206 of the random access preamble, the second number of the plurality of receivers, based on one or more of: number of wireless devices connected to the network node; signal quality such as signal strength of wireless devices connected to the network node; network node backup battery level; network node temperature; cost of network node power; distortion of one or more of the plurality of receivers, and data traffic load between the network node and wireless devices connected to the network node. An example of feature signal quality is if the network node is serving wireless devices having poor coverage already, receivers may not be inactivated to ensure communication with these wireless devices.

According to yet another embodiment, the sent 208 random access response comprises information of the subsequent random access procedure message, the information indicating to the wireless device to use more communication resources, a higher transmit power and/or a more robust coding for the subsequent random access procedure message compared to when the second number of receivers are active. By sending such information to the wireless device in the random access response, the probability of receiving the subsequent random access procedure message is increased when the second number of receivers are inactive. In other words, the transmission from the wireless device of the subsequent random access procedure message can be made more robust to ensure that the message is received at the network node with enough signal power to detect the message properly. This feature makes the determining 212 more reliable.

According to another embodiment, the method further comprises receiving 210 the subsequent random access procedure message sent by the wireless device in response to the sent random access response. Further, the reception requirement is whether the subsequent random access procedure message received has a sufficient quality. Also, the reception requirement is determined 212 not fulfilled when a signal quality of the subsequent random access procedure message is below a threshold.

The signal quality may be signal strength, Signal to Noise Ratio (SNR) etc. The signal quality threshold may be set e.g. at a level where the signal cannot be encoded if its quality is below the threshold. The signal quality threshold is preferably set differently based on number of active antennas. Hereby, the network node will activate the second number of receivers, or at least some of them, when the signal quality of the subsequent random access procedure message is below the threshold.

According to an embodiment of this embodiment, the method further comprises, when the signal quality of the received 210 subsequent random access procedure message is determined to be below the threshold and at least some of the inactive second number of receivers have been activated 214, sending 216, towards the wireless device 140, a random access message subsequent to the subsequent random access procedure message.

As the reception requirement is determined not fulfilled, the at least some of the inactive second number of receivers are activated 214. According to this embodiment, the random access procedure is then carried on by sending 216 the following random access procedure message that follows after the subsequent random access procedure message when there are more receivers active. The result may be that following messages are actually received correctly and the wireless device can carry on with data transmission and does not have to send a new random access preamble.

According to another embodiment, the activating 214 of at least some of the second number of receivers further triggers configuring a preamble received target power value and broadcasting the configured preamble received target power value in the cell in which the wireless device resides.

For an NR implementation, the preamble received target power value may be broadcasted in NR SIB1. The preamble received target power value is broadcasted in the cell so that wireless devices in the cell knows with which power the network node wants to receive the random access preamble, now when the at least some of the earlier inactivated second number of receivers have been activated again. The wireless devices use the preamble received target power value together with a pathloss calculated based on a received downlink reference signal to calculate its transmit power. The calculated transmit power is as an example the preamble received target power value plus the pathloss. When some receivers are inactivated, the UE needs to transmit at higher power to ensure coverage, while when more receivers are activated, the UE may use lower transmit power to achieve same coverage. Consequently, the preamble received target power value may be configured to a lower value when some of the second receivers are activated 214 compared to when they were inactivated. Similarly, when inactivating 202 the second number of receivers, the network node may configure and send a higher preamble receive target power value to the wireless device than when the second number of receivers were active, before the inactivation 202.

According to still another embodiment, the reception requirement is whether the subsequent random access procedure message is received. Further, the reception requirement is determined 212 not fulfilled when the subsequent random access procedure message has not been received within a running time of a timer T started when the random access response was sent 208. When no response is received when the timer ends, the reception requirement is not fulfilled. When a response is received before the timer ends, the reception requirement is fulfilled. According to another embodiment, when the network node does not receive the subsequent random access procedure message in the expected time window of timer T for a limited number of times, some of the inactivated receivers will be activated.

According to still another embodiment, the method further comprises, when the reception requirement is determined 212 fulfilled, sending, 216, towards the wireless device 140, a random access message subsequent to the subsequent random access procedure message.

According to yet another embodiment, when the reception requirement is determined 212 not fulfilled, the method may end. In other words, the network node refrains from sending any random access messages subsequent to the subsequent random access procedure message. If the wireless device still wants access to the network node, it will need to send a new random access preamble.

Figure 3:
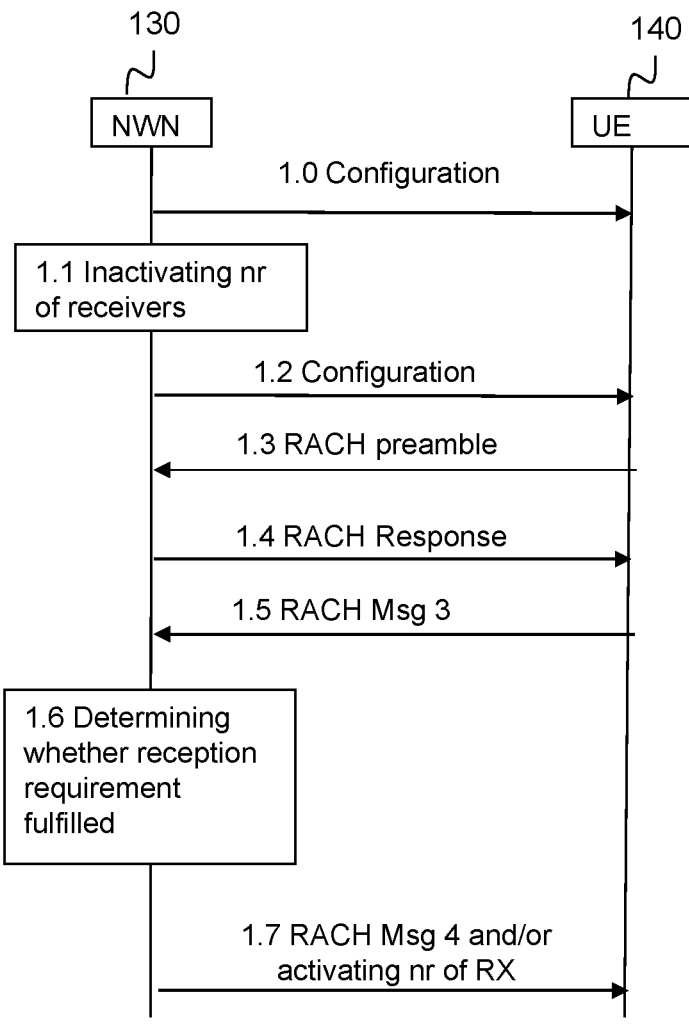
FIG. 3 is a signaling diagram illustrating an example of a procedure performed by a network node and a wireless device, according to further possible embodiments.

FIG. 3 describes a random access procedure in which embodiments of the present invention is used. The network node 130, such as the network node shown in FIG. 1 broadcasts in its cell a first configuration message 1.0 in the shape of SIB1 including information of on which communication resources UEs 140 in the cell can send a random access channel (RACH) preamble in order to get a data channel for communication with the network node. The network node 130 then for reasons such as to save power inactivates 1.1 a second number of its total number of receivers so that only a first number of the receivers are active. Such inactivation may be performed when the network load is low and/or when the UEs in the cell are in good transmission conditions, such as in LOS or situated close to the network node. However, when only the first number of receivers are used for receiving, the received signal strength of signals received from the UE 140 will be reduced compared to when all receivers are used.

The UE 140 sends a RACH preamble 1.3 on the communication resources it has been instructed to use. When receiving the RACH preamble, the network node 130 sends a RACH response 1.4 to the UE 140. The UE 140 responds to the RACH response by sending 1.5 a subsequent RACH procedure message, e.g. RACH message 3 to the network node. The network node 130 then determines 1.6 whether a reception requirement is fulfilled for the subsequent RACH procedure message sent by the UE 140. The reception requirement may be whether the network node could receive the subsequent RACH procedure message at all. Another reception requirement may be whether the received subsequent RACH procedure message had enough signal quality, for example whether the signal strength of the received subsequent RACH procedure message was above a certain threshold or not. Depending on the result of the determination 1.6, the network node may send 1.7 a RACH procedure message subsequent to the received subsequent RACH procedure message and/or the network node may activate the second number of receivers, or at least a part of the second number of receivers. More specifically, when the reception requirement is determined not fulfilled, at least a part of the second number of receivers is activated. By activating at least a part of the second number of receivers, the received signal strength will be increased again, and the reception requirement will possibly be fulfilled. With such a method, the network node can quickly react on e.g. a UE entering the cell with worse transmission conditions than the UEs already connected and increase its reception capacity to handle the newly incoming UE. As a result, it is possible for the network node to flexibly connect and disconnect receivers depending on UE need. In the long run, this will save power in the network node, which results in an environmental-friendly and cost-efficient usage of the network node. At the same time, with such a quick reaction to UE need, the UEs can be handled in an efficient and user-friendly manner.

According to an embodiment, the network node broadcasts 1.2, in connection with the inactivation 1.1 of the second number of receivers, a second configuration message for configuration of the random access preamble. This second configuration message includes a second configuration of the random access preamble that is more robust than a first configuration of the random access preamble that was broadcasted 1.0 with the first configuration message. Any UE sending a RACH preamble after the second configuration message is broadcasted will then use the second more robust configuration. In this way, the network node 130 ensures uplink coverage for RACH preambles and mitigates the risk of missing any RACH preamble sent by any UE. Also, reception of the RACH preamble and failure to receive the subsequent RACH procedure message e.g. Msg3, or a too weak Msg3 reception, can be an indicator that more RX antenna elements should be activated in the base station.

According to an embodiment, the second configuration is more robust than the first configuration in that a sequence is configured for the random access preamble that is longer in time in the second configuration than in the first configuration. For example, for network nodes under normal unmuted mode with cell range up to 10 km to 15 km, the long sequence PRACH format, PRACH Format 0 as defined in the 5G specification 3GPP TS 38.211, Table 6.3.3.1-1 and Table 6.3.3.1-2, is sufficient for uplink coverage. This PRACH format 0 fits in a 1 ms subframe, having 0.1 ms cyclic prefix, 0.8 ms PRACH sequence and 0.1 ms guard time. When half of the RX antennas are deactivated on the other hand, a longer PRACH sequence can be used as the second more robust configuration to ensure the same uplink coverage of PRACH as the unmuted mode. This longer PRACH sequence can be for example the PRACH Format 2 in the above-mentioned 5G specification. The PRACH format 2 has a 0.15 ms cyclic prefix, 3.2 ms PRACH sequence, and 0.65 ms guard time. This configuration provides 6 dB higher PRACH RX power than the PRACH format 0 and that can compensate for an approximate 3 dB loss in RX power that comes from deactivating half of the RX antennas. The PRACH format 2 can also support the case of mute 75% of the RX branches.

As another example, for network nodes under normal unmuted mode with smaller cell range such as around 500 m, the short sequence PRACH format of the above-mentioned 5G specification, e.g., Format B2 with numerology of 30 kHz subcarrier spacing can be applied. Format B2 occupies 4time domain symbols duration. When half of the RX antennas are deactivated, to ensure the same uplink coverage of PRACH as the unmuted mode, a longer PRACH sequence, for example the PRACH Format B4 of the above-mentioned 5G specification with numerology of 30 kHz subcarrier spacing can be used. Format B4 occupies 12 time-domain symbols duration. This format B4 configuration provides 4.7 dB higher PRACH RX power than the PRACH format B2 and that can be enough for compensating for the approximately 3 dB loss in RX power that comes from deactivating half of the RX antennas.

Please note that a similar concept can also be applied to 4G LTE, based on PRACH formats defined in 4G LTE specification, such as 3GPP TS 36.211, section 5.7.

According to an embodiment, the second configuration includes a shortened random access preamble periodicity compared to the first configuration. I.e. the second configuration message includes RACH preamble communication resources that are repeated more often than for the first configuration. As mentioned, when switching to a more robust RACH preamble format when the second part of the RXs are inactivated, it is possible that some poor coverage UEs cannot successfully finish the random access procedure due to the coverage issue for Msg3 and later on messages, even if the RACH preamble can be received. Then it would be helpful for those UEs to reduce the PRACH, i.e. RACH preamble, transmission periodicity to reduce the latency for being able to send a new RACH preamble. However, RACH preamble resources are expensive. Too many RACH preamble resources will reduce capacity, and too few will increase the initial access latency. In the 5G NR specification, a variety of the PRACH transmission periodicity is allowed to be configured by the network node and sent to the UE. For example, for Frequency Division Duplex (FDD) and PRACH format 0, it is possible to configure PRACH periodicity from "one per 20 ms" to "one per 1 ms", or any other value. For Time Division Duplex (TDD) and PRACH Format 0, 1 to 5 PRACH periodicity can be configured for example per 10 ms radio frame, or more often or more seldom. However, on most occasions when RX antennas are inactivated, traffic in the cell is low, which means the capacity in the cell is not a concern. Thus, it is possible to configure a short PRACH transmission periodicity to reduce the latency. Further, after activating previously inactivated RX antennas, a new configuration message can be broadcasted indicating a standard i.e. shorter preamble configuration, and the optionally the PRACH transmission periodicity can be changed to a longer periodicity again.

In the following are two examples of PRACH format and periodicity reconfiguration based on RX branch inactivation for FDD: When there is low traffic in the cell, PRACH Format 2 (robust, i.e. long preamble) and PRACH opportunities every 10 ms, which is the minimum PRACH periodicity supported in the 5G specification; When there is high traffic in the cell, PRACH configuration 0 (standard, i.e. short preamble) and PRACH opportunities every 20 ms, which can be a balance value between capacity and latency. It is worth noting that similar concept can be applied to other possible PRACH formats and periodicity configurations, which are not fully listed herein.

In the following are embodiments for handling the subsequent RACH procedure message, e.g. RACH message 3 that the UE sends 1.5 to the network node after receiving the RACH response. As mentioned, the network node determines 1.6 whether a reception requirement for the subsequent RACH procedure message is fulfilled, and when the network node determines that the reception requirement is not fulfilled, the network node, e.g. a controller in the network node, initiates an activation, i.e. initiates switch-on of some or all of the inactivated RXs. The controller can be a real entity, or a virtual entity arranged to achieve the described function.

According to an embodiment, when the network node decides to activate, aka unmute, some or all RXs for UL reception, the network node initiates reconfiguration of a system information parameter "preambleReceivedTargetPower value", and the updated preambleReceivedTargetPower is broadcasted to UEs in the cell as system information (SI). The network node may initiate the reconfiguration of this system information by triggering its controller to send commands to an entity that manages the system information, which in its turn triggers the sending of the updated system information parameter. The reconfigured value can be chosen from a predefined mapping table between preambleReceivedTargetPower and number of unmuted receive antennas and can be recalculated based on the number of unmuted receive antennas.

According to another embodiment, when the network node decides to activate some or all RXs for UL reception, the network node initiates to stop any transmission of Msg4 to those UEs whose Msg3 triggered the RX unmuting. This embodiment may be used in combination with the above embodiment of reconfiguration of the system information parameter preambleReceivedTargetPower value.

According to an embodiment, the reception requirement is whether the network node can receive the subsequent RACH procedure message sent by the UE. The fulfillment of this reception requirement can for example be determined by introducing a timer T as e.g. a system constant. The timer T starts when the network node transmits 1.4 the RACH response. When the network node fails to detect any subsequent RACH procedure message sent by the UE during the timer time, the network node determines non-fulfillment of the reception requirement when the timer T expires. According to an embodiment, the value of timer T should be larger than a contention resolution timer called ra-ContentionResolutionTimer that is configured for UEs in the cell. If the UE detects a contention on the RACH, which for example is detected when contention resolution information in RACH procedure MSG4 does not contain the identity of the UE, then the UE needs to start a timer with a random duration which is the ra-ContentionResolutionTimer. When this timer expires, the UE is allowed to make a new PRACH transmission. If the timer T is shorter than the ra-ContentionResolutionTimer, then the UE has not yet transmitted any subsequent RACH procedure message.

According to another embodiment, the reception requirement is whether the subsequent RACH procedure message, e.g. Msg 3 that the network node receives from the UE has a sufficient quality. The fulfillment of this reception requirement can for example be determined by comparing a determined or measured signal quality, such as signal power with a predetermined threshold value or condition. The threshold value can be set as a system constant. The threshold value is preferably set differently depending on the number of active RX antennas, or the percentage of active antennas compared to all antennas of the network node. The threshold value can be selected from a predefined mapping table between signal power threshold and number of active RX antennas, or it can be recalculated based on the number of active RX antennas.

For a UE that triggered the above-mentioned activation of at least some of the inactive second number of receivers, when this UE cannot receive a message subsequent to the subsequent RACH procedure message, such as a Msg4, this UE will restart the random access procedure according to the NR protocol. When this UE sends the subsequent RACH procedure message again in the next random access procedure, the subsequent RACH procedure message will be received together by all the now unmuted RXs, and the UL link budget is thus increased. If the network node still cannot receive the subsequent RACH procedure message or the threshold condition still cannot be met, and if some RXs are still muted, the controller is to instruct to switch on more RXs until all RXs are unmuted. If the network node can detect the subsequent RACH procedure message and threshold condition(s) are met, the muted RXs will stay inactive, and the message subsequent to the subsequent RACH procedure message, i.e. Msg4, is to be transmitted as planned.

Figure 4:
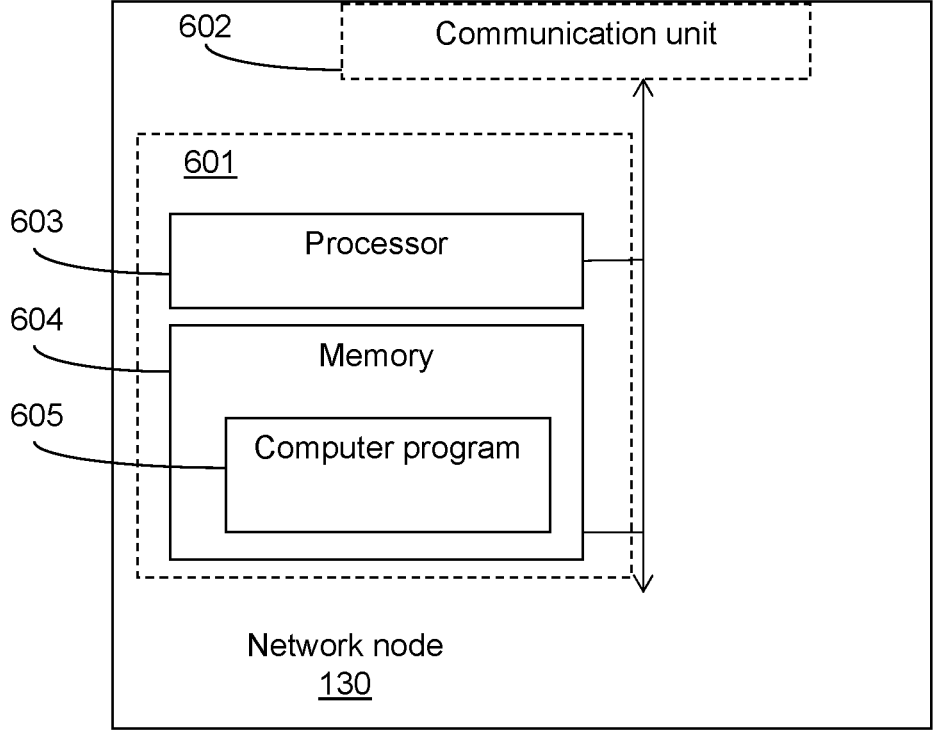
FIG. 4 is a block diagram illustrating a network node in more detail, according to further possible embodiments.

FIG. 4, in conjunction with FIG. 1 shows a network node 130 configured to operate in a wireless communication network 100. The network node 130 has a plurality of receivers 131, 132, 133. The network node 130 comprises a processing circuitry 603 and a memory 604. Said memory contains instructions executable by said processing circuitry, whereby the network node 130 is operative for receiving, from a wireless device 140, a random access preamble when a first number of the plurality of receivers are active and a second number of the plurality of receivers are inactive, and sending, to the wireless device 140, a random access response, in response to the received random access preamble. The network node 130 is further operative for determining whether a reception requirement for a subsequent random access procedure message sent by the wireless device towards the network node is fulfilled, the subsequent random access procedure message being sent by the wireless device subsequent to the network node sending the random access response, the reception requirement being either whether the random access procedure message is received at the network node or whether the random access procedure message that is received has a sufficient quality, and, when the reception requirement is determined not fulfilled, activating at least some of the inactive second number of receivers.

According to an embodiment, the network node 130 is further operative for broadcasting, before the receiving of the random access preamble from the wireless device 140 and in connection with inactivation of the second number of receivers, a configuration message for configuration of the random access preamble, the configuration message including a second configuration of the random access preamble that is more robust than a first configuration of the random access preamble that is broadcasted when no receivers or fewer receivers than the second number of receivers are inactivated. Also, the network node is operative for receiving the random access preamble of the second configuration.

According to another embodiment, the second configuration is more robust than the first configuration in that a sequence is configured for the random access preamble that is longer in time in the second configuration than in the first configuration.

According to another embodiment, the second configuration of the broadcasted configuration message includes a shortened random access preamble periodicity compared to the first configuration.

According to yet another embodiment, the network node is further operative for inactivating, before the receiving of the random access preamble, the second number of the plurality of receivers, based on one or more of: number of wireless devices connected to the network node; signal quality such as signal strength of wireless devices connected to the network node; network node backup battery level; network node temperature; cost of network node power; distortion of one or more of the plurality of receivers, and data traffic load between the network node and wireless devices connected to the network node.

According to another embodiment, the random access response comprises information on the subsequent random access procedure message, the information indicating to the wireless device to use more communication resources, a higher transmit power and/or a more robust coding for the subsequent random access procedure message compared to when the second number of receivers are active.

According to yet another embodiment, the network node is further operative for receiving the subsequent random access procedure message sent by the wireless device in response to the sent random access response. Further, the reception requirement is whether the subsequent random access procedure message received has a sufficient quality. Also, the network node is operative for determining that the reception requirement is not fulfilled when a signal quality of the subsequent random access procedure message is below a threshold.

According to yet another embodiment, the network node is further operative for, when the signal quality of the received subsequent random access procedure message is determined to be below the threshold and at least some of the inactive second number of receivers have been activated, sending, towards the wireless device 140, a random access message subsequent to the subsequent random access procedure message.

According to another embodiment, the network node 130 is operative for triggering configuring of a preamble received target power value and broadcasting the configured preamble received target power value in the cell in which the wireless device resides, in response to the activating of at least some of the second number of receivers.

According to another embodiment, the reception requirement is whether the subsequent random access procedure message is received. Further, the network node is operative for determining that the reception requirement is not fulfilled when the subsequent random access procedure message has not been received within a running time of a timer T started when the random access response was sent.

According to yet another embodiment, the network node is further operative for, when the reception requirement is determined fulfilled, sending, towards the wireless device 140, a random access message subsequent to the subsequent random access procedure message.

According to other embodiments, the network node 130 may further comprise a communication unit 602, which may be considered to comprise conventional means for wireless communication with the wireless device 140, such as a transmitter for wireless transmission of signals in the communication network. The communication unit 602 may also comprise conventional means for communication with other network nodes of the wireless communication network 100, such as other network nodes. The instructions executable by said processing circuitry 603 may be arranged as a computer program 605 stored e.g. in said memory 604. The processing circuitry 603 and the memory 604 may be arranged in a sub-arrangement 601. The sub-arrangement 601 may be a micro-processor and adequate software and storage therefore, a Programmable Logic Device, PLD, or other electronic component(s)/processing circuit(s) configured to perform the methods mentioned above. The processing circuitry 603 may comprise one or more programmable processor, application-specific integrated circuits, field programmable gate arrays or combinations of these adapted to execute instructions.

The computer program 605 may be arranged such that when its instructions are run in the processing circuitry, they cause the network node 130 to perform the steps described in any of the described embodiments of the network node 130 and its method. The computer program 605 may be carried by a computer program product connectable to the processing circuitry 603. The computer program product may be the memory 604, or at least arranged in the memory. The memory 604 may be realized as for example a RAM (Random-access memory), ROM (Read-Only Memory) or an EEPROM (Electrical Erasable Programmable ROM). In some embodiments, a carrier may contain the computer program 605. The carrier may be one of an electronic signal, an optical signal, an electromagnetic signal, a magnetic signal, an electric signal, a radio signal, a microwave signal, or computer readable storage medium. The computer-readable storage medium may be e.g. a CD, DVD or flash memory, from which the program could be downloaded into the memory 604. Alternatively, the computer program may be stored on a server or any other entity to which the network node 130 has access via the communication unit 602. The computer program 605 may then be downloaded from the server into the memory 604.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for an apparatus or method to address each and every problem sought to be solved by the presently described concept, for it to be encompassed hereby. In the exemplary figures, a broken line generally signifies that the feature within the broken line is optional.

The invention claimed is:

1. A method performed by a network node of a wireless communication network, the network node having a plurality of receivers, the method comprising:
    receiving, from a wireless device, a random access preamble when a first number of the plurality of receivers is active and a second number of the plurality of receivers is inactive;
    sending, to the wireless device, a random access response, in response to the received random access preamble;
    determining whether a reception requirement for a subsequent random access procedure message sent by the wireless device towards the network node is fulfilled, the subsequent random access procedure message being sent by the wireless device subsequent to the network node sending the random access response, the reception requirement being either whether the subsequent random access procedure message is received at the network node or whether the subsequent random access procedure message that is received has a sufficient quality; and
    when the reception requirement is determined not fulfilled, activating at least some of the inactive second number of receivers.

2. The method according to claim 1, further comprising:
    broadcasting, before the receiving of the random access preamble from the wireless device and in connection with inactivation of the second number of receivers, a configuration message for configuration of the random access preamble, the configuration message including a second configuration of the random access preamble that is more robust than a first configuration of the random access preamble that is broadcasted when no receivers or fewer receivers than the second number of receivers are inactivated, and wherein the random access preamble that is received is of the second configuration.

3. The method according to claim 2, wherein the second configuration is more robust than the first configuration in that a sequence is configured for the random access preamble that is longer in time in the second configuration than in the first configuration.

4. The method according to claim 2, wherein the second configuration of the broadcasted configuration message includes a shortened random access preamble periodicity compared to the first configuration.

5. The method according to claim 1, further comprising:
    inactivating, before the receiving of the random access preamble, the second number of the plurality of receivers, based on one or more of: number of wireless devices connected to the network node; signal quality such as signal strength of wireless devices connected to the network node; network node backup battery level; network node temperature; cost of network node power; distortion of one or more of the plurality of receivers, and data traffic load between the network node and wireless devices connected to the network node.

6. The method according to claim 1, wherein the sent random access response comprises information on the subsequent random access procedure message, the information indicating to the wireless device to use more communication resources, a higher transmit power and/or a more robust coding for the subsequent random access procedure message compared to when the second number of receivers are active.

7. The method according to claim 1, further comprising:
   receiving the subsequent random access procedure message sent by the wireless device in response to the sent random access response, and
wherein the reception requirement is whether the subsequent random access procedure message received has a sufficient quality, and wherein the reception requirement is determined not fulfilled when a signal quality of the subsequent random access procedure message is below a threshold.

8. The method according to claim 7, further comprising, when the signal quality of the received subsequent random access procedure message is determined to be below the threshold and at least some of the inactive second number of receivers have been activated, sending, towards the wireless device, a random access message subsequent to the subsequent random access procedure message.

9. The method according to claim 1, wherein the activating of at least some of the second number of receivers further triggers configuring a preamble received target power value and broadcasting the configured preamble received target power value in the cell in which the wireless device resides.

10. The method according to claim 1, wherein the reception requirement is whether the subsequent random access procedure message is received, and wherein the reception requirement is determined not fulfilled when the subsequent random access procedure message has not been received within a running time of a timer T started when the random access response was sent.

11. The method according to claim 1, further comprising, when the reception requirement is determined fulfilled:
   sending, towards the wireless device, a random access message subsequent to the subsequent random access procedure message.

12. A network node configured to operate in a wireless communication network, the network node having a plurality of receivers, the network node comprising a processing circuitry and a memory, said memory containing instructions executable by said processing circuitry, whereby the network node is operative to:
   receive, from a wireless device, a random access preamble when a first number of the plurality of receivers is active and a second number of the plurality of receivers is inactive;
   send, to the wireless device, a random access response, in response to the received random access preamble;
   determine whether a reception requirement for a subsequent random access procedure message sent by the wireless device towards the network node is fulfilled, the subsequent random access procedure message being sent by the wireless device subsequent to the network node sending the random access response, the reception requirement being either whether the subsequent random access procedure message is received at the network node or whether the subsequent random access procedure message that is received has a sufficient quality; and
   when the reception requirement is determined not fulfilled, activate at least some of the inactive second number of receivers.

13. The network node according to claim 12, further being operative to:
   broadcast, before the receiving of the random access preamble from the wireless device and in connection with inactivation of the second number of receivers, a configuration message for configuration of the random access preamble, the configuration message including a second configuration of the random access preamble that is more robust than a first configuration of the random access preamble that is broadcasted when no receivers or fewer receivers than the second number of receivers are inactivated, and wherein the network node is operative for receiving the random access preamble of the second configuration.

14. The network node according to claim 13, wherein the second configuration is more robust than the first configuration in that a sequence is configured for the random access preamble that is longer in time in the second configuration than in the first configuration.

15. The network node according to claim 13, wherein the second configuration of the broadcasted configuration message includes a shortened random access preamble periodicity compared to the first configuration.

16. The network node according to claim 12, further being operative to:
   inactivate, before the receiving of the random access preamble, the second number of the plurality of receivers, based on one or more of: number of wireless devices connected to the network node; signal quality such as signal strength of wireless devices connected to the network node; network node backup battery level; network node temperature; cost of network node power; distortion of one or more of the plurality of receivers, and data traffic load between the network node and wireless devices connected to the network node.

17. The network node according to claim 12, wherein the random access response comprises information on the subsequent random access procedure message, the information indicating to the wireless device to use more communication resources, a higher transmit power and/or a more robust coding for the subsequent random access procedure message compared to when the second number of receivers are active.

18. The network node according to claim 12, further being operative to:
   receive the subsequent random access procedure message sent by the wireless device in response to the sent random access response, and wherein the reception requirement is whether the subsequent random access procedure message received has a sufficient quality, and wherein the network node is operative to determine that the reception requirement is not fulfilled when a signal quality of the subsequent random access procedure message is below a threshold.

19. The network node according to claim 18, further being operative to, when the signal quality of the received subsequent random access procedure message is determined to be below the threshold and at least some of the inactive second number of receivers have been activated, send, towards the wireless device, a random access message subsequent to the subsequent random access procedure message.

20. The network node according to claim 12, operative to trigger configuring of a preamble received target power value and broadcasting the configured preamble received target power value in the cell in which the wireless device resides, in response to the activating of at least some of the second number of receivers.

* * * * *